Aug. 26, 1952     F. J. MEYER     2,608,503
METHOD OF MAKING ADHESIVE TAPES AND ADHESIVE UNITS
Filed Sept. 16, 1950
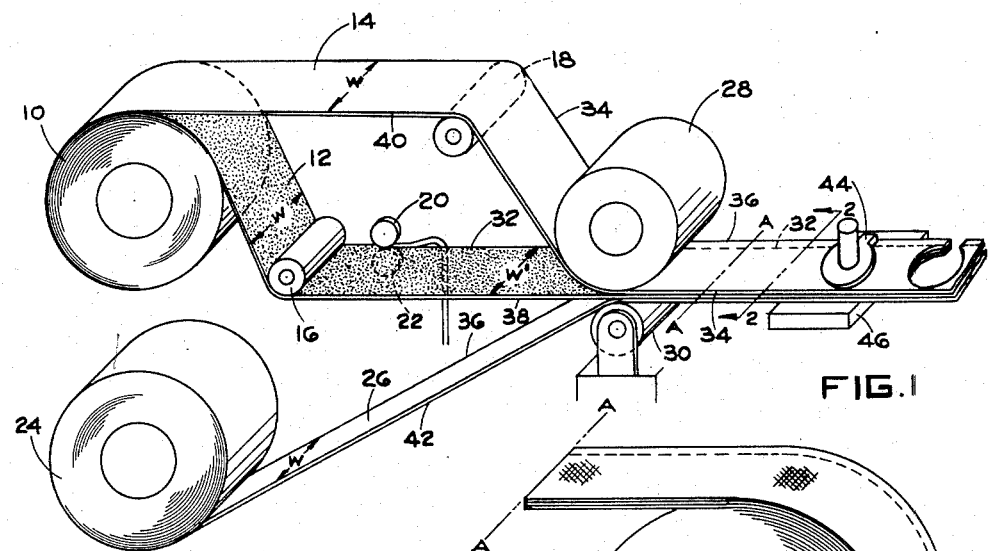
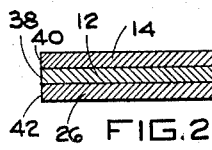
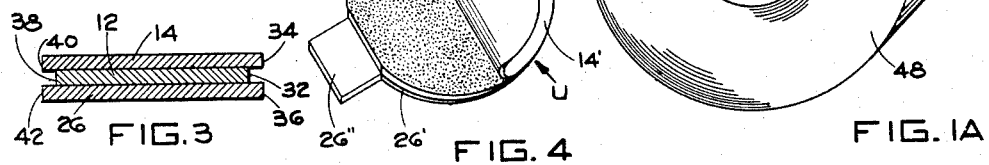
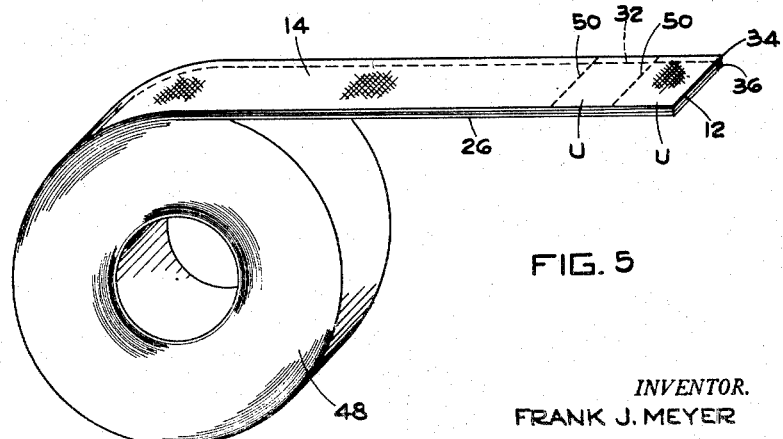
INVENTOR.
FRANK J. MEYER
BY Harry G. Shapiro
ATTORNEY Patented Aug. 26, 1952

2,608,503

UNITED STATES PATENT OFFICE 2,608,503

METHOD OF MAKING ADHESIVE TAPES AND ADHESIVE UNITS

Frank J. Meyer, East Orange, N. J.

Application September 16, 1950, Serial No. 185,259

12 Claims. (Cl. 154—118)

The invention relates to the art of adhesive tapes and adhesive units, and more particularly to methods for making same.

The principal object of my invention is to provide simple methods for producing adhesive tapes and adhesive units of the type comprising a layer of adhesive material having a layer of liner material removably adhered to a side thereof. Adhesive tapes or units of the type referred to provided with means facilitating the stripping away of a layer of liner material to expose an underlying surface of the adhesive layer are known in the art. My invention relates to novel methods for producing adhesive tapes and units of the type described having a layer of liner material so arranged with respect to an adhered layer of adhesive material that stripping away of the liner is facilitated.

To accomplish the foregoing general objects and more specific objects which will hereinafter appear, my invention resides in novel methods for making adhesive tapes and adhesive units as hereinafter more particularly described in the following specification. The specification is accompanied by a drawing in which:

Fig. 1 illustrates diagrammatically the steps in my novel method for producing adhesive units;

Fig. 1A illustrates a modification of the invention whereby an adhesive tape laminate may be produced by substituting the showing in this figure for the subject-matter to the right of the line A—A in Fig. 1;

Fig. 2 is a cross-section taken along the line 2—2 of Fig. 1;

Fig. 3 is a view similar to Fig. 2, but showing a modification of the invention;

Fig. 4 is a perspective view of an adhesive unit produced in accordance with the method illustrated in Fig. 1; and Fig. 5 is a side elevation of a roll of adhesive tape made in accordance with the method of the present invention.

Referring to the drawings and more particularly to Fig. 1, a roll 10 is provided comprising linearly coextensive strips of adhesive material 12 and liner material 14 having the same widths, designated $w$. The adhesive strip 12 is self-supporting and preferably comprises any suitable base, such as paper, coated on both sides or impregnated with a normally tacky, pressure-sensitive adhesive. The liner strip 14 may be of any suitable material, such as Holland cloth, polyethylene, or any material sized, coated or treated to prevent permanent adherence to the pressure-sensitive adhesive coating or impregnant of the strip 12. The described layer of adhesive material is originally made in widths of sixty inches, or more, and adhered to a coextensive layer of liner material. The laminate is then slit into relatively narrow widths on the order of approximately one to two inches, as desired, prior to winding into a roll. As an alternative, the laminate is wound into a wide roll prior to slitting it into a plurality of narrow rolls of the relatively narrow widths indicated. The roll 10 is of such narrow width and made in the manner described.

The adhered coextensive strips 12 and 14 are led off the roll 10 and separated from each other, as shown, by leading the strip 12 under a guide or roller 16 and leading the strip 14 over a guide or roller 18. The strip of adhesive material 12 is continuously slit or cut longitudinally of its length by a suitable cutting means, such as the cutting rolls 20, 22. The edge portion of this adhesive material which is cut away is relatively narrow and may be on the order of one-quarter of an inch.

A second roll 24 is provided comprising a strip 26 of liner material only and having a width, $w$, equal to the width of the strip 14. After the strip 12 has had its width reduced by the cutting means 20, 22, such reduced width being designated $w'$, the strips 12, 14 and 26 are led between the pressure rollers 28 and 30 driven by any suitable means (not shown). The three strips are united in the relationship that the strip of adhesive material 12 is located between, and completely covered on each surface thereof by, the strips of liner material 14 and 26. As shown in Fig. 2, the strips are assembled so that one longitudinal edge 32 of the strip of adhesive material 12 is spaced inwardly from the adjacent longitudinal edges, designated 34 and 36, of the strips of liner material 14 and 26, respectively. The other longitudinal edges of the strips 12, 14 and 26, designated 38, 40 and 42, respectively, are coextensive with each other. If desired, the strips may be assembled, as shown in Fig. 3, so that both longitudinal edges 32, 38 of the strip 12 may be spaced inwardly from the adjacent longitudinal edges of the strips 14 and 26.

Subsequent to the laminating operation of the three strips in the relationship described, adhesive units may be directly produced from the resultant laminate, as shown in Fig. 1 by a punching or cutting operation. Suitable means for accomplishing this purpose may comprise a punch 44 and die 46. One of the resulting adhesive units, designated U, is shown in Fig. 4.

The adhesive unit U comprises the layers of liner material 14' and 26' with the intermediate layer of adhesive material 12'. Due to the described manner of assembly of the laminate, the layers of liner material extend beyond the edge of the adhesive material and provide finger-grasping tab portions 14" and 26" which facilitate stripping away an overlying layer of liner material to expose the underlying adhesive layer preparatory to application to an article.

Instead of directly cutting or punching adhesive units from the described laminate, as shown in Fig. 1, the laminate may be wound up as shown in Fig. 1A to form a roll 48. Adhesive units may be formed by the ultimate user of the adhesive units by cutting or tearing the same from the roll 48. Thus, as shown in Fig. 5, the roll 48 may be unwound and adhesive units U formed by cutting or tearing across the described laminate as along the lines 50. Due to the described positional relationship of the layers of liner and adhesive material, one or both layers of liner material may easily be peeled away by grasping the portion or portions of liner material which extends or extend beyond the edge 32 of adhesive material.

It is within the scope of the invention to form a roll of adhesive material-liner material laminate with but one strip of liner material. Referring to Fig. 5, the strip of liner material 26 may be omitted. After separating the coextensive strips of adhesive material and liner material 12, 14, the strip 12 is slit longitudinally as shown in Fig. 1, then the two strips are reunited with one or both longitudinal edges of the strip of adhesive material spaced inwardly from the adjacent longitudinal edges of the strip of liner material, as shown in Figs. 2 and 3. The laminate comprising the strip of adhesive material and single layer of liner material is then wound upon itself to form a roll, the convolutions of the single strip of liner material being between and adequate to prevent adherence of the convolutions of adhesive material.

It will be understood that while I have shown and described the invention in several preferred forms, many changes may be made without departing from the spirit of the invention as sought to be defined in the following claims.

I claim:

1. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, providing a second strip of liner material having substantially the same width as said first strip of liner material, and uniting the three strips in the relationship that the strip of adhesive material is located between and covered by the strips of liner material with a longitudinal edge of the strip of adhesive material spaced inwardly from the adjacent longitudinal edges of the strips of liner material.

2. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, providing a second strip of liner material having substantially the same width as said first strip of liner material, and uniting the three strips in the relationship that the strip of adhesive material is located between and covered by the strips of liner material with a longitudinal edge of the strip of adhesive material spaced inwardly from the adjacent longitudinal edges of the strips of liner material, the other longitudinal edges of the three strips being coextensive.

3. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, providing a second strip of liner material having substantially the same width as said first strip of liner material, and uniting the three strips in the relationship that the strip of adhesive material is located between and covered by the strips of liner material with both longitudinal edges of the strip of adhesive material spaced inwardly from the adjacent longitudinal edges of the strips of liner material.

4. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, providing a second strip of liner material having substantially the same width as said first strip of liner material, uniting the three strips in the relationship that the strip of adhesive material is located between and covered by the strips of liner material with a longitudinal edge of the strip of adhesive material spaced inwardly from the adjacent longitudinal edges of the strips of liner material, and winding the resultant laminate upon itself to form a roll thereof.

5. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, providing a second strip of liner material having substantially the same width as said first strip of liner material, uniting the three strips in the relationship that the strip of adhesive material is located between and covered by the strips of liner material with a longitudinal edge of the strip of adhesive material spaced inwardly from the adjacent longitudinal edges of the strips of liner material, the other longitudinal edges of the three strips being coextensive, and winding the resultant laminate upon itself to form a roll thereof.

6. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, providing a second strip of liner material having substantially the same width as said first strip of liner material, uniting the three strips in the relationship that the strip of adhesive material is located between and covered by the strips of liner material with both longitudinal edges of the strip of adhesive material spaced inwardly from the adjacent longitudinal edges of the strips of liner material, and winding the resultant laminate upon itself to form a roll thereof.

7. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, providing a second strip of liner material having substantially the same width as said first strip of liner material, uniting the three strips in the relationship that the strip of adhesive material is located between and covered by the strips of liner material with a longitudinal edge of the strip of adhesive material spaced inwardly from the adjacent longitudinal edges of the strips of liner material, and cutting the resultant laminate to form individual adhesive units each having a finger-grasping tab portion of liner material free of underlying adhesive material at the area extending beyond the edge of adhesive material.

8. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, providing a second strip of liner material having substantially the same width as said first strip of liner material, and uniting the three strips in the relationship that the strip of adhesive material is located between and covered by the strips of liner material, with a longitudinal edge of the strip of adhesive material spaced inwardly from the adjacent longitudinal edges of the strips of liner material, the other longitudinal edges of the three strips being coextensive, and cutting the resultant laminate to form individual adhesive units having a finger-grasping tab portion of liner material free of underlying adhesive material at the area extending beyond the edge of adhesive material.

9. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, providing a second strip of liner material having substantially the same width as said first strip of liner material, uniting the three strips in the relationship that the strip of adhesive material is located between and covered by the strips of liner material with both longitudinal edges of the strip of adhesive material spaced inwardly from the adjacent longitudinal edges of the strips of liner material, and cutting the resultant laminate to form individual adhesive units each having finger-grasping tab portions of liner material free of underlying adhesive material at the areas extending beyond the edges of adhesive material.

10. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, reuniting said strips in the relationship that a longitudinal edge of the strip of adhesive material is spaced inwardly from an adjacent longitudinal edge of the strip of liner material, and winding the resultant laminate upon itself to form a roll thereof.

11. A method for making a laminated article comprising completely separating a strip of liner material from a linearly coextensive strip of adhesive material, said strip of adhesive material comprising a base layer provided on both surfaces with a pressure-sensitive adhesive, longitudinally cutting said strip of adhesive material to reduce the width thereof, reuniting said strips in the relationship that a longitudinal edge of the strip of adhesive material is spaced inwardly from the adjacent longitudinal edge of the strip of liner material, the other longitudinal edges of the strips being coextensive, and winding the resultant laminate upon itself to form a roll thereof.

12. A method for making a laminated article comprising completely separating a strip of liner material from a linearly co-extensive strip of adhesive material, said strip of adhesive material comprising a base layer provided on both surfaces with a pressure-sensitive adhesive, longitudinally cutting said strip of adhesive material to reduce the width thereof, reuniting said strips in the relationship that both longitudinal edges of the strip of adhesive material are spaced inwardly from the adjacent longitudinal edges of the strip of liner material, and winding the resultant laminate upon itself to form a roll thereof.

FRANK J. MEYER.

REFERENCES CITED

The following references are of record in the file of this patent:

UNITED STATES PATENTS

| Number | Name | Date |
|---|---|---|
| 2,030,135 | Carpenter | Feb. 11, 1936 |
| 2,306,178 | Meany | Dec. 22, 1942 |
| 2,491,281 | Rowe | Dec. 13, 1949 |
| 2,491,282 | Rowe | Dec. 13, 1949 |

FOREIGN PATENTS

| Number | Country | Date |
|---|---|---|
| 634,317 | France | Nov. 18, 1927 |
| 679,341 | France | Jan. 6, 1930 |